J. P. CLARK.
Exhaust Mechanism for Locomotive-Engines.
No. 197,720. Patented Dec. 4, 1877.
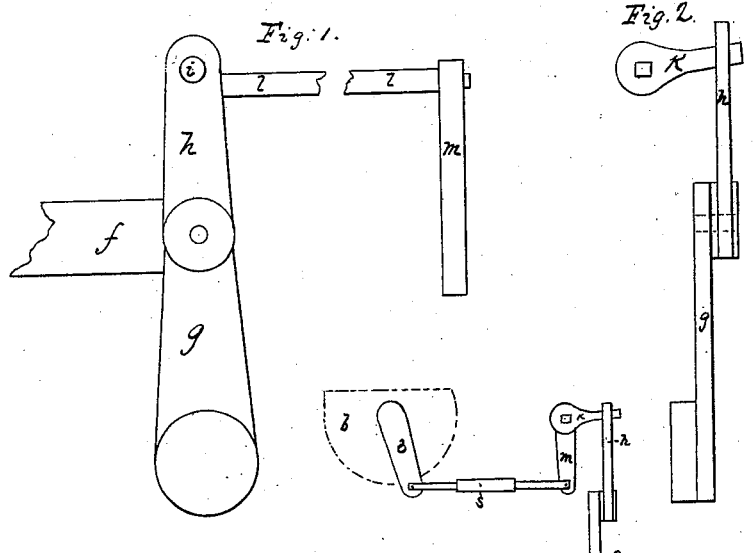
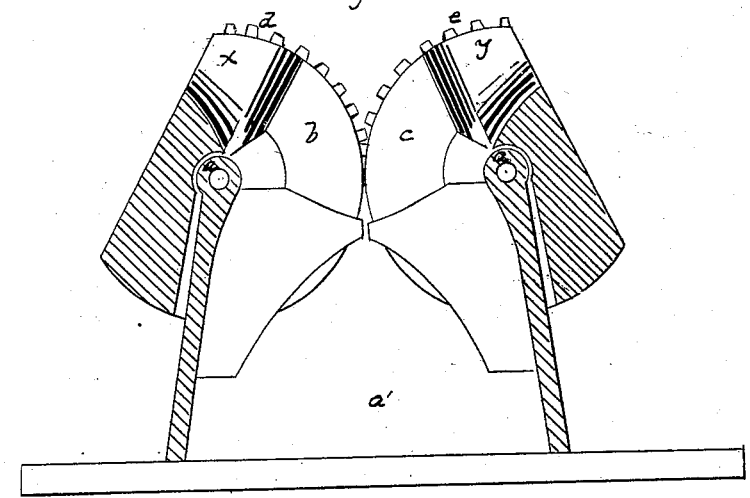
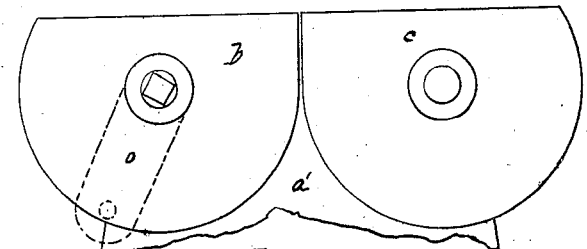

UNITED STATES PATENT OFFICE.

JOSIAH P. CLARK, OF PORTLAND, MAINE.

IMPROVEMENT IN EXHAUST MECHANISMS FOR LOCOMOTIVE-ENGINES.

Specification forming part of Letters Patent No. 197,720, dated December 4, 1877; application filed August 1, 1877.

*To all whom it may concern:*

Be it known that I, JOSIAH P. CLARK, of Portland, in the county of Cumberland and State of Maine, have invented certain new and useful Improvements in the Construction and Operation of Locomotive Exhaust-Valves; and I do hereby declare that the following is a full, clear, and exact description thereof, that will enable others skilled in the art to which it appertains to make and use the same, reference being had to the accompanying drawings, forming a part of this specification, in which—

Figure 1 is a front elevation of the device for operating the valves. Fig. 2 is a side elevation of the same. Fig. 3 is a lateral vertical section of the improved exhaust, and Fig. 4 an end view of the same; Fig. 5, a side elevation of the mechanism for operating the valves, showing the extensible rods.

My invention relates to an improved method of operating the exhausts of locomotive steam-engines. Exhausts which admit of adjustment in accordance with the quantity of steam passing through them, known as "variable exhausts," have hitherto been operated and controlled by means of a rod running from the cab of the engine, and worked by the hand of the engineer.

My improvement consists in connecting the exhaust, by means of suitable mechanism, with the reverse-lever shaft.

A variable exhaust is shown in Figs. 1, 3, and 4.

The pipe $a'$ is similar to the ordinary exhaust, diminishing in size slightly toward the top, where it is provided on either side with horizontal sockets $a$. By means of these sockets the pieces or valves $b$ and $c$, their external shape being shown in Fig. 4, are connected with the pipe, which is so modified in shape at its upper part as to admit of their attachment. These valves $b$ and $c$ have small concentric semicircular openings in the top, and being connected with the pipe by means of the pin inserted in the socket $a$, they admit of an upward and outward movement. In order that this movement may be uniform with both of the valves, they are provided, at one or both ends, with the intermatching gears $d$ and $e$. On either side of the sockets $a$ the valves $b$ and $c$ are cut away on the inside, so as to form a smooth continuation of the pipe, whatever position they assume, and, on the exterior, to admit of their movement on the pivot. Motion is communicated to the valves by means of suitable mechanism, hereinafter described, operating the crank $o$, attached to the axis of the valve $b$. (See Fig. 4.)

By this method of construction the opening of the valves is capable of being increased from a comparatively small aperture to one of three or four times the size. At the points marked by the letters $b$ and $c$, Fig. 3, the interior portions are so removed as to leave but a thin partition on either end of the valves $b$ and $c$, so that when the valves are moved upward, as shown in Fig. 3, the aperture is nearly equal to the width of the valves.

The portions $x$ and $y$ at the upper edges of the valves $b$ and $c$, around the semicircular openings, are left intact, so that as the valves are moved downward, to the position indicated in Fig. 4, the aperture approaches in size the small opening formed by the semicircular openings in the upper surface of the valves.

Exhaust-valves have hitherto been opened and closed, and otherwise controlled, when variable, by a rod running from the cab of the engine, and worked by hand. The imperfectness of this method must be apparent.

The mechanism for operating the valves is illustrated in Figs. 1, 2, and 5. $h$ is a crank pivoted to the upper end of the tumble-shaft arm $g$. The crank $h$ has a hole, $i$, in its upper extremity, through which is inserted the end of the arm $k$, which is fixed upon the shaft $l$. This shaft has at its other extremity the crank $m$, which is connected by means of an extensible rod with the crank $o$ upon the valve $b$.

It will be seen that when the arm $g$, being in a perpendicular position, as seen in Fig. 1, is carried to the right or left, and returned to a perpendicular position, two movements are given to the crank $m$.

In practical use the device for opening and closing the valves will be operated by means of the reverse-lever shaft $f$, attached to the arm $h$ and arm $g$, as seen in Fig. 1.

The operation of the valves thus constructed and controlled is evident. When the reverse-lever is at the center of the circle, the valves have their smallest opening, being in the position shown in Fig. 4.

It being desired to start the locomotive, the reverse-lever is thrown either backward or forward, as required, carrying the reverse-lever shaft $f$ backward or forward, thus drawing down the arm $k$, which, communicating motion by means of the shaft $l$ and cranks $m$ and $o$, connected by means of the extensible rods, opens the valves. When the reverse-lever is thrown farthest from the center, the valves will be open to their fullest extent. The opening of the valves, being proportioned to the movement of the reverse-lever, is, therefore, in proportion to the amount of steam admitted to the cylinder. As the reverse-lever is brought to the center again, the opening of the valves is gradually reduced to the minimum. In this manner the draft is under control, and so regulated that it is strongest when needed, and proportionately less as required.

I do not broadly claim the use of valves for the purpose of forming a variable exhaust, nor such a device as is shown and claimed in Letters Patent of the United States No. 24,785, issued to J. Barney, July 19, 1859.

What I claim as my invention, and desire to secure by Letters Patent of the United States, is—

1. A variable-exhaust mechanism connected with and operated by the reverse-lever shaft of the locomotive, substantially as and for the purposes set forth.

2. An exhaust for locomotive steam-engines, having the valves $b$ and $c$, as described, in combination with the arm $g$, crank $h$, arm $k$, shaft $l$, crank $m$, and crank $o$, said cranks $m$ and $o$ being connected by means of an extensible rod.

In testimony that I claim the foregoing I have hereunto set my hand this 26th day of July, 1877.

JOSIAH P. CLARK.

Witnesses:
 GEO. E. BIRD,
 T. T. SNOW.